United States Patent
Swanson et al.

(10) Patent No.: US 9,154,459 B2
(45) Date of Patent: Oct. 6, 2015

(54) ACCESS CONTROL MANAGER

(71) Applicant: Malwarebytes Corporation, San Jose, CA (US)

(72) Inventors: Douglas Stuart Swanson, Providence, RI (US); Daniel Young, Sandpoint, ID (US); John Moore, Loveland, CO (US)

(73) Assignee: Malwarebytes Corporation, San Jose, CA (US)

(*) Notice: Subject to any disclaimer, the term of this patent is extended or adjusted under 35 U.S.C. 154(b) by 87 days.

(21) Appl. No.: 14/037,180

(22) Filed: Sep. 25, 2013

(65) Prior Publication Data

US 2015/0089625 A1    Mar. 26, 2015

(51) Int. Cl.
*H04L 29/06* (2006.01)

(52) U.S. Cl.
CPC ........ *H04L 63/0227* (2013.01); *H04L 63/0236* (2013.01); *H04L 63/0263* (2013.01); *H04L 63/101* (2013.01)

(58) Field of Classification Search
CPC ............... H04L 63/02; H04L 63/0227; H04L 63/0236–63/0263
See application file for complete search history.

(56) References Cited

U.S. PATENT DOCUMENTS

| | | | |
|---|---|---|---|
| 2005/0169274 A1* | 8/2005 | Shuster | 370/392 |
| 2006/0212931 A1* | 9/2006 | Bohlman et al. | 726/10 |
| 2007/0250916 A1* | 10/2007 | Shull et al. | 726/5 |
| 2010/0064362 A1* | 3/2010 | Materna et al. | 726/15 |

* cited by examiner

*Primary Examiner* — Gilberto Barron, Jr.
*Assistant Examiner* — Arya Golriz
(74) *Attorney, Agent, or Firm* — Fenwick & West LLP

(57) ABSTRACT

A network access manager controls access to a network interface according to a set of access control instructions specifying permissible and impermissible addresses and domains on a network. The network access manager establishes a graylist of addresses based on a domain request that is associated with a whitelisted domain that is accessed via a blacklisted address. When a request to establish a connection is received directed to a graylisted address, the connection is permitted to establish and the connection is added to a session graylist. When a session data transfer packet is received, if the session corresponds to a session on the session graylist, the session data transfer packet is examined to determine if it matches a whitelisted domain, in which case the session is associated with a session whitelist and permitted access to the network. The access control instructions may be automatically updated from a trusted access control management system.

10 Claims, 3 Drawing Sheets

ACCESS CONTROL MANAGER

BACKGROUND

This invention relates generally to reducing exposure of computer systems to malicious content.

Malicious content on a network, such as the Internet, poses a threat to systems and users accessing the network. Malicious content may infect computer systems to cause the computer to perform undesired behavior, such as reducing performance, obtaining sensitive files from the computer, and intercepting account information. Past methods of infecting a user's computer typically focused on attacking a user's passive computer, for example by identifying open ports on a user's computer. More recent methods include convincing a user to access a system containing malicious content. For example, a user may be presented with a website mimicking the behavior of a legitimate website, or the user may access a link that appears to be for a legitimate service. In addition to user behavior, applications or other programs on the computing device may request access to a network address that contains malicious content, whether intentionally or inadvertently (i.e., the network address was expected to contain safe content by the user or application author).

SUMMARY

An access control manager on a computing system receives requests to access addresses on the network and determines whether to permit access to the network address based on the target address of the request. The access control manager connection requests at the domain request level, the session setup level, and the session data transfer level. When a domain request is received, the access control manager determines the target address of a request, such as an IP address for the target address. The target address is matched against a set of access rules to determine whether the target address matches instructions for access. When the domain or address matches a whitelist, the connection is permitted. The access control manager manages any conflict between the domain and address, for example when the domain is associated with a domain whitelist and the address is associated with an address blacklist. At the domain request level, permissions for an address are modified, for example by identifying normally blacklisted addresses that are associated with whitelisted domains by adding addresses to an address graylist. At the session setup level, sessions are added to a session whitelist, blacklist, and graylist based on the address whitelist, graylist, and blacklist. When the target address of the session matches a blacklist, the request to access an address is denied. When the target address of the session matches a graylist, the request is further processed to determine whether to permit or deny access. If the address does not match any list, the request is processed using a default action, such as allowing the request or further processing the request. At the session data transfer level, when a packet is received for a session associated with the graylist, the packet is inspected to determine if it relates to a domain associated with a domain whitelist. If so, the session is moved to a session whitelist, and otherwise the session may be moved to a session blacklist. In this way, future data transfer packets may be immediately processed by determining the session is white or blacklisted.

The access rules are updated by the access control manager from a trusted access control management system. The access control management system maintains configuration data for the access rules for various computing systems. The access control management system determines which access rules to apply to various addresses. The access rules are automatically updated by the computing device to reduce the need for user intervention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
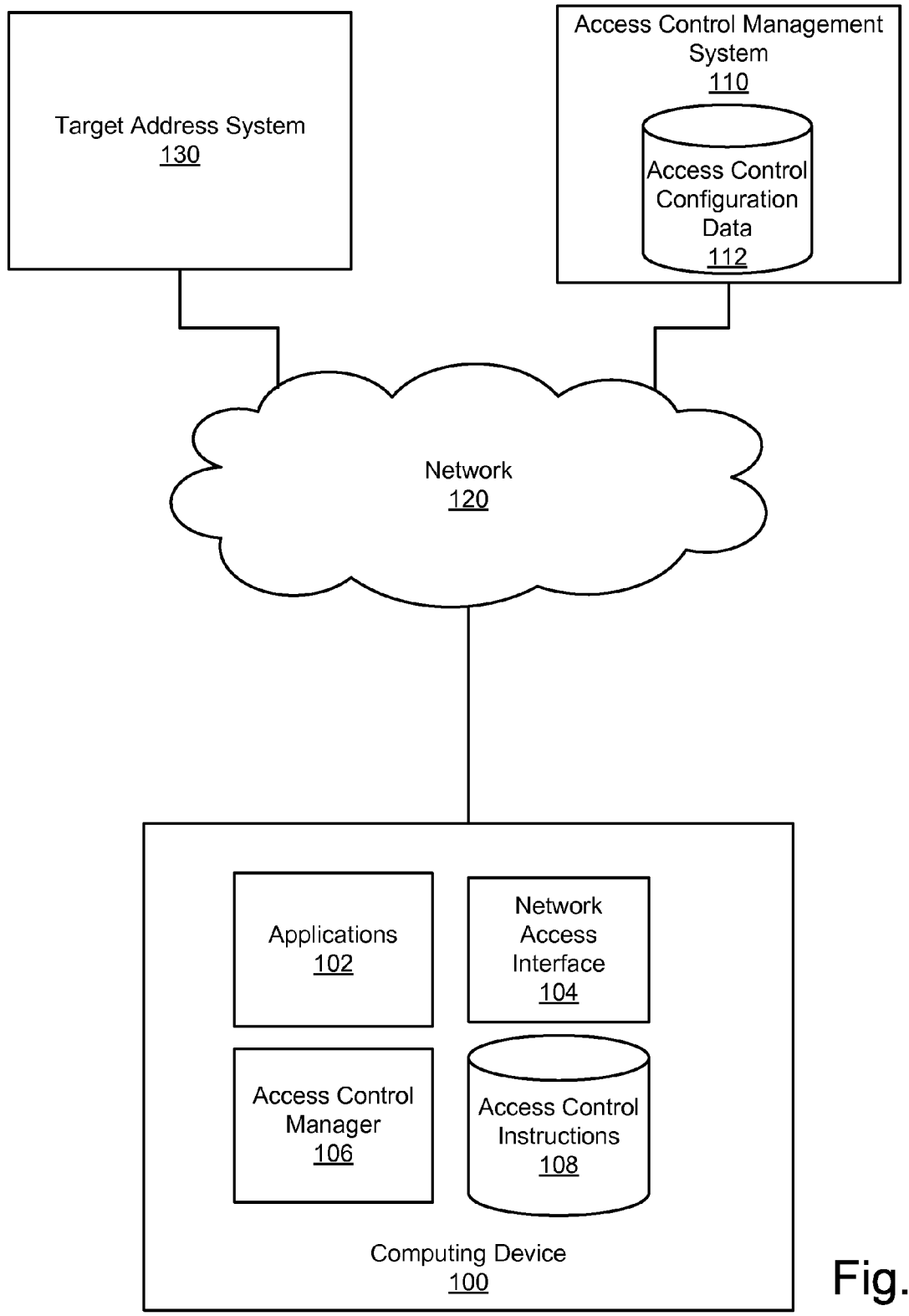
FIG. 1 illustrates an environment of a computing device including an access control manager according to one embodiment.

FIG. 1 illustrates an environment of a computing device including an access control manager according to one embodiment. The computing device 100 communicates through a network 120 to an access control management system 110 and, if permitted, with target address system 130. The computing device 100 includes various applications 102 and other services that request access to target address systems 130 over the network 120.

The network 120 is any suitable communications channel for transmitting data between multiple computer systems. The network 120 is typically the internet, though other networking systems may also be used. The network 120 transmits data to the computer systems using an addressing system for data transferred to the network 120. For example, in one embodiment the network 120 implements an address-port protocol termed TCP/IP. In one embodiment of this protocol, such as IPv4, the IP protocol identifies each identifiable address as a number comprising four numbers that range between 0 and 127, such as 10.23.120.88. In other embodiments, the addressing protocol comprises additional numbers and may include a wider or narrower range of values. This address indicates a target address system 130 on the network 120 to direct the communication. The address may also indicate a port on the target address system 130 to direct the communication. The port is used by the target address system 130 to identify a particular data stream between the sending and receiving computer. The data stream is typically bound to a particular application or service. For example, port 80 is customarily bound to a service for providing a web page.

To communicate with a target address system 130, the sending system (e.g., computing device 100) identifies the address associated with the desired target address system 130. The sending system typically uses a domain name, such as a universal resource locator (URL), to determine an exact address on the network 120 to send a communication. The sending system performs a look-up to determine the address associated with the desired domain. Thus, to determine the address for a domain "requesteddomain.com" the sending system requests a domain lookup from a lookup server (not shown) on the network. The lookup server provides a response indicating the address of the domain name on the network 120. While described with respect to resolving particular types of domains and addressing methods (e.g., IPv4), this disclosure is applicable to additional methods of addressing and domain lookup techniques.

After receiving a response indicating the address, the sending system initiates a session for data transfer with the target address system 130. The session establishes a connection between the sending and receiving systems and establishes any particular protocols for data transfer between them. During the session, data is transferred between the sending and receiving systems. After finishing the data transfer, the session is ended between the systems.

The computing device 100 includes a network access interface 104 for accessing the network 120 and communicating to other systems, such as target address system 130 and access control management system 110. The network access interface 104 is any suitable method for communicating with the network 120, such as a wired or wireless connection to an access point of the network 120.

Applications 102 execute on the computing device 100 and request access to target address systems such as the target address system 130. The applications 102 may be any process resident on the computing device 100 that requests access to the target address system 130 on the network 120, including programs executing on a processor and any other hardware or software module. To access the target address system 130, the applications 102 provide requests to establish a connection and transmit information through an interface to the network access interface 104, such as a programming interface in an operating system of the computing device 100.

An access control manager 106 manages access of applications 102 to addresses on the network 120, such as the target address system 130. The access control manager 106 receives access requests from the applications 102, either directly from the applications 102 or through an applicable interface to the network access interface 104. For example the access control manager 106 may be installed as a kernel-level module that receives and processes requests to access the target address system 130. Depending on the request, the access control manager 106 allows or rejects the request to access the network 120. To allow a request, the access control manager 106 provides the request to the network access interface 104. To reject a request, the access control manager 106 transmits a rejection to the requesting application 102, or the access control manager 106 deletes the request and does not provide a response to the application 102.

To determine whether to allow a network access request, the access control manager 106 maintains a list of allowable and disallowable domains and addresses in a list of access control instructions 108. Allowable entries are termed a whitelist, and disallowable entries are termed a blacklist. The access control manager 106 uses the lists to determine whether to permit a domain resolution request, establish a connection, and enable packet transmission in a connection. The access control manager 106 maintains a list of sessions representing connections between applications 102 and target address systems 130. The access control manager 106 adds sessions to a permission list when a domain resolution request or connection initiation request is processed. The permission lists designate whitelist and blacklist sessions. In addition, one permissions list maintains sessions that are established but have not yet been determined as permitted or denied, termed a session graylist. For packets sent in a permitted or denied session, the packets are transmitted or rejected immediately. For packets in a session that are sent in a graylisted session, the access control manager 106 inspects the packet categorize the session based on details in the packet. To determine access permissions, the access control manager 106 inspects packets directed to the network access interface 104 and compares the domain and address in the packet to the access control instructions 108. The access control manager 106 may also update the access control instructions based on configuration data stored at the access control management system 110. The access control manager 106 is further described with reference to FIG. 2.

The access control instructions 108 include permissible domains and addresses for access on the network and denied domains and addresses for access on the network. The access control instructions 108 are updated based on configuration information from the access control management system 110 or from user instructions. The access control manager 106 may access updates to the access control instructions 108 by receiving direction from the user, e.g. a user designated list of permissible addresses or user-selected groups of domains or addresses.

The access control management system 110 communicates with the access control manager 106 for updating and the access control instructions 108. The access control management system 110 maintains a set of access control configuration data 112. The access control configuration data 112 is routinely updated by operators and systems of the access control management system 110 as permissible and impermissible target systems are identified. The access control management system 110 may include additional modules for scanning addresses on the network and identifying the source of harmful or malicious content on the network 120. In addition, the access control management system 110 may receive reports of malicious code or programs from computing devices 100 and associate the source of such malicious content with an impermissible address in the access control configuration data 112. Operators of target address systems 130 may also contact the access control management system 110 to identify a target address system 130 as a permissible domain and to register associated addresses with the domain of the target address system 130. In these and various other ways, the access control management system 110 maintains and updates data regarding permissible (safe) and impermissible (unsafe) addresses on the network 120.

The access control management system 110 may also categorize the types of addresses it maintains details on. For example, the access control management system 110 may identify target addresses as financial institutions, news, file sharing, and others. The access control management system 110 in one embodiment also identifies an estimated risk level for each site. The categories and estimated risk levels may assist a user in selecting types and risk levels acceptable to a computing device 100.

Figure 2:
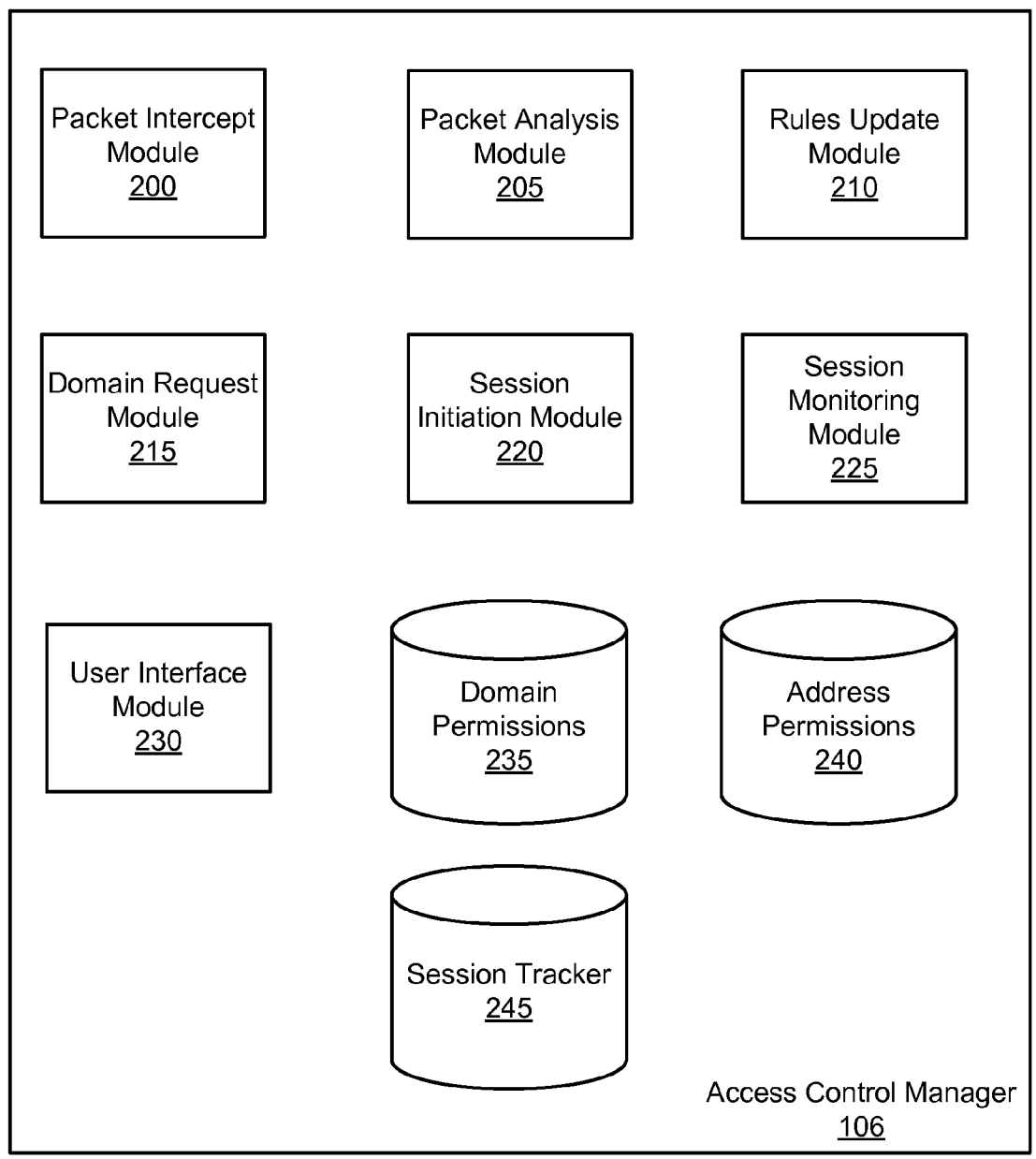
FIG. 2 illustrates modules and data stores of the access control manager in one embodiment.

FIG. 2 illustrates modules and data stores of the access control manager 106 in one embodiment. The access control manager 106 includes various modules for receiving packets sent to the network access interface 104, interpreting those packets, and determining permissions for transmitting the packets to the network access interface 104. During operation, the access control manager 106 maintains various data, such as domain permissions 235, address permissions 240, and a session tracker 245. The domain permissions 235 maintains a blacklist and whitelist for domains, while the address permissions 240 maintains a blacklist and whitelist for specific addresses. The address permissions 240 may also maintain a graylist designating addresses that appear on the blacklist but may correspond to a whitelist domain. These lists are loaded from the access control instructions 108 and used to match domain and address information to the applicable white and blacklist.

The session tracker 245 maintains a list of active sessions transmitting data to a target system. A session stored in the session tracker 245 identifies the local address and local port, along with the remote address, remote port, and the transmission protocol being used for the session. In other embodiments, a session may identify more or fewer aspects of an ongoing connection. The session tracker 245 maintains a list of active allowed sessions and active blocked sessions in a session whitelist and blacklist, and may additionally maintain a session graylist. The session graylist designates sessions initiated for graylist addresses that may, or may not, correspond to permitted domains. The session graylist indicates sessions for which further inspection of packets corresponding to the session is necessary for determining the session status.

A packet intercept module 200 intercepts packets provided by applications 102 destined for the network access interface 104. The packet intercept module 200 in one embodiment is a kernel-level process that intercepts packets provided to the normal network access handlers in an operating system. After receiving the packet, the packet intercept module 200 passes the packet to a packet analysis module 205.

The packet analysis module 205 determines the type of packet that was received by the packet intercept module 200. Specifically, the packets may generally be classified as a domain look-up packet, a session initiation packet, or as corresponding to an existing session. Depending on the type of packet, the packet is passed to an applicable module for processing. The identification of a packet type will vary based on the type of addressing and network protocols used by the network 120. The packet analysis module 205 identifies packet information specifying aspects of the packet, such as the destination address, destination port, transmission protocol type, and other details. The packet analysis module 205 also determines additional information for certain types of packets. For example, the packet analysis module 205 may determine that the packet comprises an HTTP request that specifies a URL. The packet analysis module 205 extracts the URL from these HTTP request packets, which also includes the domain of the requested packet. Similarly, the associated domain for a domain look-up request is extracted. The packet analysis module 205 is extensible to secured and non-secured communications. In one embodiment, the packet analysis module 205 extracts information from a packet including encrypted information. For example, the packet analysis module 205 may analyze traffic sent via secure socket layer (SSL).

To classify the packet type, the packet analysis module 205 analyzes the extracted information from the packet. In certain network protocols, domain look-up requests are identifiable by certain characteristics. For example, in one embodiment, domain look-up requests are transmitted using a UDP packet transmitted to a specific port at a destination address, such as port 53. These identified domain look-up requests are passed to a domain request module 215. Other packets may be a part of an existing session, or be a packet initiating a new session. The packet information is compared with the sessions stored in the session tracker 245. When the packet information matches a session, the packet is considered a part of a current session and passed to the session monitoring module 225. When the packet information does not match a session, the packet is passed to a session initiation module 220.

The domain request module 215 determines whether to allow a domain request packet to request a domain and establishes permissions for a session based on the domain and an address returned for the domain. The domain request module 215 determines whether the domain request is associated with a domain in the domain permissions 235. When the domain request is associated with a domain in the domain permissions 235, the domain request module 215 allows the domain request packet to query for the address associated with the domain, adds the domain to a monitoring list, and waits for a response indicating the address associated with the domain. For whitelisted domains, the returned address may be a blacklisted address. For blacklisted domains, the returned address may be whitelisted. In this embodiment, if either a domain or an address is whitelisted, the communications are permitted. If the domain is not on the whitelist or the blacklist, the domain request module 215 allows the domain request to resolve the domain to an address normally.

When a domain resolution packet (i.e., a packet designating an address for a domain) is received from the network access interface 104, the packet intercept module 200 passes the domain resolution packet to the domain request module 215, which determines whether the domain is on the monitoring list. If the domain in the resolution packet does not match any domains on the monitoring list, the domain resolution packet is processed normally and the domain resolution packet is transferred to the requesting application 102. When the domain matches the monitoring list, the address in the domain resolution packet is determined and compared against the address permissions 240. When the domain is on the whitelist, the domain resolution packet is permitted to return to the requesting application 102, and if the address is on the blacklist, the address is added to an address graylist. When the domain is on the blacklist, the domain resolution packet is dropped unless the address is on the whitelist. If the address is on the whitelist, the domain resolution packet is returned to the requesting application 102 so that the application may communicate with the address despite that the domain is on the blacklist.

The session initiation module 220 receives transfer initiation packets from the packet intercept module 200 to determine whether to permit a session to begin with the address specified in the transfer initiation packet. In one embodiment, the transfer initiation packet is an ALE Connect request. The address is compared to address permissions 240 to determine whether to permit the connection to connect. If the address is on the address whitelist or address graylist, the packet is allowed to be sent to the network 120 to establish a connection. When the address is on the whitelist, information describing the connection is added to a session whitelist in the session tracker 245. The information describing the connection includes information to specifically describe the connection, such as the connection type (or protocol), local address, local port, destination port, and destination address. When the address is on the graylist, information describing the connection is added to a session graylist in the session tracker 245. When the address is on the blacklist, the session connection request is dropped. When the address does not correspond to any specific list, a default action is performed, such as permitting the connection, requesting a user designation of a permission for the session, or denying the connection.

The session monitoring module 225 determines whether packets are associated with existing sessions in the session tracker 245 and if so, whether to permit or deny the packet transmission. When a session packet is received by the session monitoring module 225, the session monitoring module 225 determines information in the packet and matches it to the session information at the session tracker 245. When the session is a whitelisted session, the packet is permitted to be transmitted, and when the session is a blacklisted session, the packet is dropped. In these circumstances, the session monitoring module 225 is able to quickly determine whether to permit or deny the packet transmission without further inspecting the packet.

When the session is a graylisted session, the session corresponds to an address that is a blacklisted address, but may have a whitelisted domain. In this case, the session monitoring module 225 attempts to determine if this session (as indicated by this packet) is related to a permissible domain. To determine if the domain is permissible, the session monitoring module 225 analyzes the packet to determine if the domain is included in the packet. Determining a domain may differ based on the type of packet being transmitted. For example, in a packet that comprises an HTTP request, the HTTP request may include the full HTTP address (which includes the domain) within the packet. The session monitoring module 225 accesses the HTTP address to identify the domain of the packet. When the domain is accessible and corresponds to a whitelist, the session is moved from the graylist to the whitelist in the session tracker 245 and the packet is permitted to be transmitted. When the packet does not correspond to the whitelist, the session is moved to the session blacklist in the session tracker 245. In this way, after an initial analysis of the packets in a session, future packets may be processed quickly as identified with either the whitelist or blacklist sessions.

The rules update module 210 and user interface module 230 manage and control the domain permissions 235, address permissions 240, and access control instructions 108. The rules update module 210 accesses the access control management system 110 to retrieve access control configuration data 112 for storage as the access control instructions 108. The user interface module 230 provides an interface for the user to add or delete addresses or domains from the different permission lists. The user may specify individual websites or addresses to add to the whitelist. In various embodiments, the user interface module 230 allows the user to manage the permissions in various ways. In one embodiment, the user is not permitted to modify the permissions provided by the access control configuration data.

Figure 3:
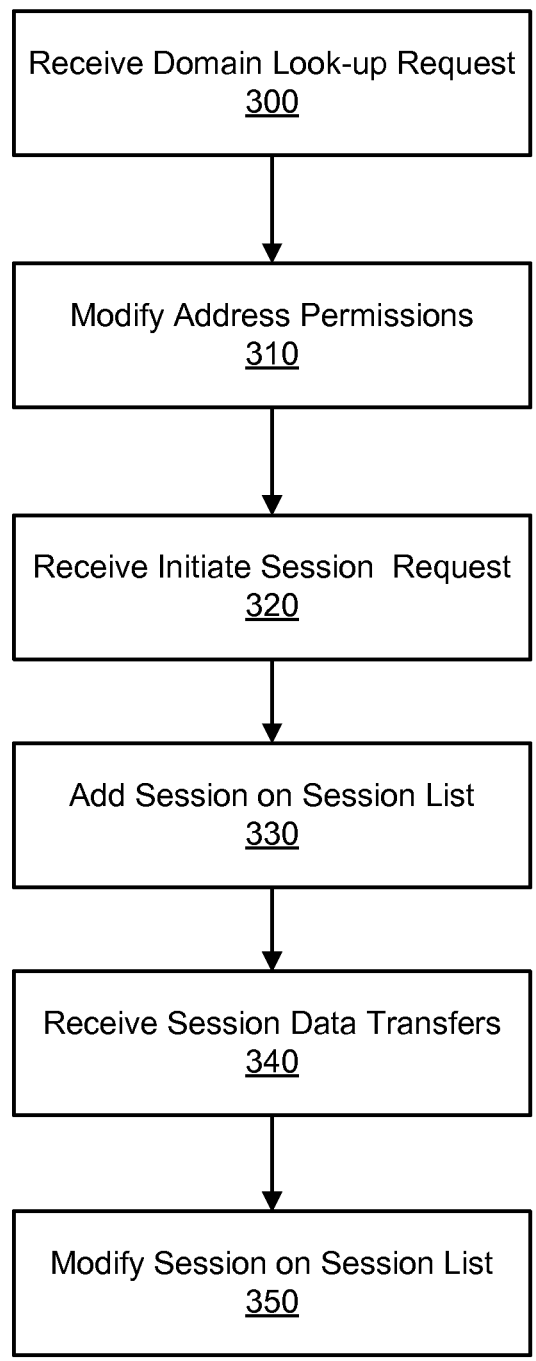
FIG. 3 is a flowchart showing the processing of a connection according to one embodiment.

FIG. 3 is a flowchart showing the processing of a connection according to one embodiment. This process may be performed by the various components of access control manager 106. First, a domain look-up request is received 300. The type of domain is determined and the access control manager 106 monitors received domain resolution packets to determine the permission of the domain and associated address as described above. If necessary, the address permissions are modified 310, such as when a whitelisted domain is resolved to a blacklisted address, in which case the address is added to a graylist. Next, the request to initiate a session is received 320 and the session is added 330 to the applicable session list. When the session corresponds to a graylisted address, the session is added to a graylist. Next, session data transfers are received 340. The packets are permitted or denied based on whether the session is a graylisted or whitelisted session, and in the case of a graylisted session, the session is modified 350 on the session list based on whether the packet belongs to a permitted domain. In this way, conflicting domain and address information is resolved without unduly delaying packets for authentication.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for domain-based network access management in a computer, comprising:

receiving a session data transfer packet specifying a network address;

determining whether the network address corresponds to a session on a session graylist, the graylist indicating sessions that are associated with an network address that is not permitted access and at least one domain that is permitted access;

determining a domain associated with the session data transfer packet;

determining whether the domain is a permissible domain;

responsive to determining that the network address corresponds to a session on the session graylist and the domain is a permissible domain, associating the session with a session whitelist and permitting the session data transfer packet access to a network interface;

receiving an initiate session packet specifying a session address;

determining whether the session address matches an address in an address graylist, the address graylist indicating a set of addresses that are selectively permitted access to the network interface;

responsive to determining that the session address matches an address in the address graylist, permitting the initiate session packet access to the network interface and adding the session to the session graylist;

receiving, from a requester, a domain resolution request packet specifying a resolution domain and permitting the domain resolution request packet access to the network interface;

receiving a domain resolution response from the network interface specifying a domain network address;

determining whether the resolution domain is a permissible domain and whether the network address is a permissible address; and responsive to determining that the domain is a permissible domain and the network address is not a permissible address, adding the network address to the address graylist.

2. The method of claim 1, further comprising, responsive to determining that the network address does not correspond to a permissible domain, associating the session with a session blacklist and preventing the session data transfer packet access to the network interface.

3. The method of claim 1, further comprising receiving a second session data transfer packet specifying the network address;

determining that the second session data transfer packet corresponds to the session on the session whitelist without determining a domain associated with the second data transfer request; and permitting the second session data transfer packet access to the network interface.

4. The method of claim 1, wherein the network address is stored in a header of the session data transfer packet.

5. The method of claim 1, wherein the domain is determined from a payload of the session data transfer packet.

6. A computer system comprising:

a network interface configured for accessing a network; and a processor configured to receive a session data transfer packet specifying a network address;

determine whether the network address corresponds to a session on a session graylist, the graylist indicating sessions that are associated with an network address that is not permitted access and at least one domain that is permitted access;

determine a domain associated with the session data transfer packet;

determine whether the domain is a permissible domain;

responsive to determining that the network address corresponds to a session on the session graylist and the domain is a permissible domain, associate the session with a session whitelist and permit the session data transfer packet access to the network interface;

receive an initiate session packet specifying a session address;

determine whether the session address matches an address in an address graylist, the address graylist indicating a set of addresses that are selectively permitted access to the network interface;

responsive to determining that the session address matches an address in the address graylist, permit the initiate session packet access to the network interface and add the session to the session graylist;

receive, from a requesting application, a domain resolution request packet specifying a resolution domain and permit the domain resolution request packet access to the network interface;

receive a domain resolution response from the network interface specifying a domain network address;

determine whether the resolution domain is a permissible domain and whether the network address is a permissible address; and responsive to determining that the domain is a permissible domain and the network address is not a permissible address, add the network address to the address graylist.

7. The system of claim 6, wherein the processor is further configured to, responsive to determining that the network address does not correspond to a permissible domain, associate the session with a session blacklist and prevent the session data transfer packet access to the network interface.

8. The system of claim 6, wherein the processor is further configured to receive a second session data transfer packet specifying the network address;

determine that the second session data transfer packet corresponds to the session on the session whitelist without determining a domain associated with the second data transfer request; and permit the second session data transfer packet access to the network interface.

9. The method of claim 6, wherein the network address is stored in a header of the session data transfer packet.

10. The method of claim 6, wherein the domain is determined from a payload of the session data transfer packet.

* * * * *